United States Patent Office 2,800,479
Patented July 23, 1957

2,800,479

CARBOXYLIC ACID AND ESTER DERIVATIVES OF 8-ALKYLNORTROPANES AND METHODS FOR THEIR PREPARATION

Charles L. Zirkle, Haddon Heights, N. J., assignor to Smith, Kline & French Laboratories, Philadelphia, Pa., a corporation of Pennsylvania No Drawing. Application July 1, 1955,
Serial No. 519,647

8 Claims. (Cl. 260—292)

This invention relates to certain new physiologically active carboxylic acid and ester derivatives of 8-alkyl-nortropanes and acid addition and quaternary ammonium salts thereof. The invention further relates to methods of preparing these compounds.

The new chemical compounds according to this invention have utility, for example, for treating the parasympathetic nervous system in providing, for example, antispasmodic and anticholinergic action and further have utility as antiemetics and for treating the central nervous system, for example, for treating psychotics and psychoneurotics. The compounds of this invention also have utility as intermediates for use in the preparation of compounds having utility for treating the parasympathetic nervous system in providing, for example, antispasmodic and anticholinergic action and further having utility as antiemetics and for treating the central nervous system, for example, for treating psychotics and psychoneurotics. Where the salts are used for therapeutic purposes, it will be obvious to those skilled in the art to select a non-toxic salt.

The new compounds according to this invention have the structure shown by the following formula:

FORMULA 1

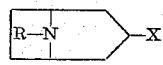

in which: R is a straight or branched chain lower alkyl radical having preferably from 1 to 4 carbon atoms.

X is selected from the group consisting of —COOR$_1$; —CH$_2$COOR$_1$, which is preferred; —CH$_2$CH$_2$COOR$_1$ and —CH$_2$CH$_2$CH$_2$COOR$_1$, R$_1$ being selected from the group consisting of hydrogen and a straight or branched chain lower alkyl radical having preferably from 1 to 4 carbon atoms.

More succinctly, the new compounds of this invention have the structure shown in the following formula:

FORMULA 2

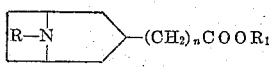

in which: R and R$_1$ are as given above and $n$ is from 0 to 3, preferably 1.

Where hereinafter the symbols R, R$_1$ and $n$ are mentioned in the description, they will indicate the substituents indicated for them in connection with the above general formulas.

The organic and inorganic salts of the base of the above formulas contemplated by this invention include by way of example salts of the base formed with organic acids such as, for example, tartaric, maleic, camphorsulfonic, citric, acetic, propionic, butyric, succinic, glutaric, adipic, ascorbic, lactic, levulinic, malic, mandelic, cinnamic, gluconic, methanesulfonic, benzene sulfonic, fumaric, citraconic, itaconic, lauric, stearic, myristic, palmitic, linoleic, aspartic and sulfoacetic, and inorganic acids such as, for example, hydrochloric, hydrobromic, sulfuric, sulfamic, phosphoric, nitric, etc. and can readily be produced by reacting the free base with the appropriate acid.

This invention also embraces quaternary ammonium salts formed with organic esters of sulfuric, hydrohalic and aromatic sulfonic acids. Exemplary of such esters are methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene sulfonate, ethyl toluene sulfonate, and the like.

The quaternary ammonium salts will be prepared by treating a solution of the base of the above structural formulas in a suitable solvent such as chloroform, acetone, benzene, toluene or ether with an excess of an organic ester of sulfuric, hydrohalic or aromatic sulfonic acid. This reaction will be carried out most advantageously at a temperature in the range of from about 25° C. to about 115° C.

The compounds in accordance with this invention and as identified by the above structural formulas may be prepared variously by one of four methods, from the following description of which, procedure for the preparation of all of the several compounds will be apparent to those skilled in the art, the compounds set forth as starting materials in the description of the methods being known or made known herein.

METHOD A

The compounds of this invention where $n$ is 0 in Formula 2 above are obtained by the reaction sequence outlined below:

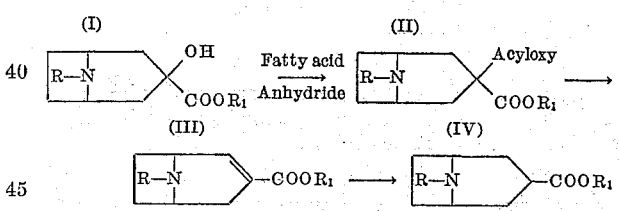

The acyloxy ester (II) is obtained in good yield when the hydroxy ester (I), preferably with R$_1$=methyl, is treated with an excess of lower fatty acid anhydride having preferably 4 to 8 carbon atoms, advantageously with an excess of acetic anhydride. Pyrolysis of the acyloxy ester (II) using a temperature of about 350° C. to about 500° C. by passage of the acyloxy ester through a column packed with, for example, inert heat resistant beads, tubes or rods such as clay or heat resistant glass (Pyrex) beads, tubes or rods, and swept with nitrogen, and heated to a temperature in the range of about 350° C. to about 500° C. furnishes the unsaturated ester (III). The saturated ester (IV, R$_1$=lower alkyl) is obtained by hydrogenation of the unsaturated ester (III) using, for example, a noble metal catalyst such as platinum or palladium or a Raney nickel catalyst and at room temperature and atmospheric pressure or at elevated temperatures and pressures. The acid (IV, R$_1$=H) is obtained as the hydrochloride salt by refluxing the saturated ester with an excess of hydrochloric acid and then removing the excess acid in vacuo. The thus formed acid is readily esterified to produce the ethyl, propyl, butyl esters, etc. using ethanol, propanol and butanol, etc., respectively.

METHOD B

The preparation of the compounds of Formula 2 above where n is from 1 to 3 is illustrated for the preparation of these compounds where n=1 in the scheme below:

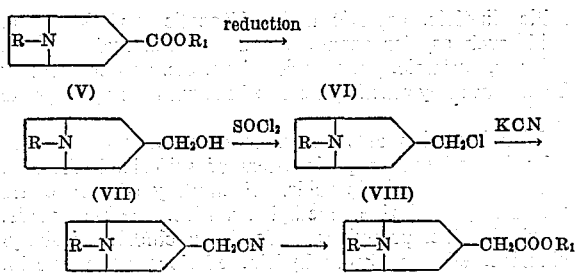

The carboxylic acid or ester (IV) is reduced to the carbinol (V) using, for example, lithium aluminum hydride, or in the case of the esters, using sodium-alcohol combinations, or catalytic hydrogenation. The halide (VI), in the form of its hydrochloride salt, is obtained from the reaction of (V) with excess thionyl chloride. The halide base (VI) is converted to the nitrile (VII) by reaction with sodium or potassium cyanide preferably in an aqueous alcohol medium. The acid (VIII, $R_1$=H) is formed by acidic or basic hydrolysis of the nitrile (VII). The ester (VIII, $R_1$=lower alkyl) may be obtained by esterification of the acid (VIII, $R_1$=H) or alternatively by alcoholysis of the nitrile (VII).

It will be apparent to those skilled in the art that the application of the above reaction sequence to the ester or acid (VIII) will furnish the ester or acid having the following structure:

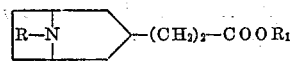

and that in turn when this compound is subjected to the above reaction sequence a compound having the following structural formula will result:

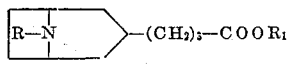

METHOD C

By way of further example, the compounds of Formula 2 above where n is 1 may also be readily made by the reaction sequence outlined below:

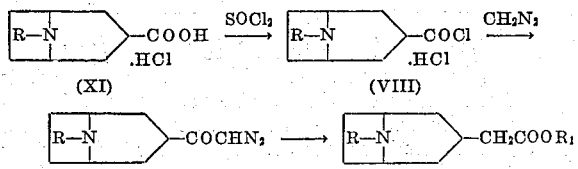

The hydrochloride of the amino acid (IX) is converted to the acid chloride hydrochloride (X) which in turn yields the diazoketone (XI) by reaction with a large excess of diazomethane. The diazoketone (XI) is converted in the presence of a suitable catalyst, as, for example, silver oxide and a suitable medium such as, for example, methanol, ethanol, propanol, or butanol, to the ester (VIII). Where an aqueous medium is used the carboxylic acid (VIII) is produced. Similarly, the hydrochloride of the amino acid

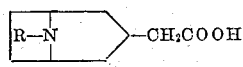

when used as the starting material in the above described reaction sequence will form the compounds of Formula 2 above where n=2. Similarly the hydrochloride of the compound of Formula 2 where n=2 can then in turn be used as the starting material in the reaction sequence given above to form the compounds of Formula 2 above where n=3.

METHOD D

The compounds of Formula 2 above where n=1 may also be formed by the following reaction sequence:

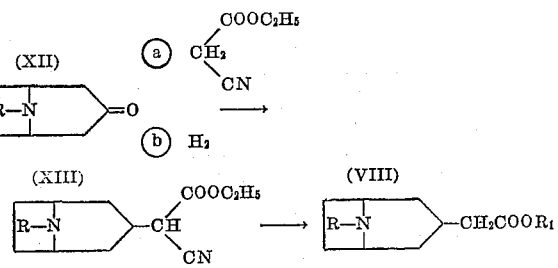

An N-alkyl-nor-tropinone (XII) is reacted with a lower alkyl ester of cyanoacetic acid such as methyl, ethyl or butyl, cyanoacetate (the ethyl ester being specifically illustrated above) using as a solvent, for example, a lower fatty acid such as propionic, acetic or butyric acid and preferably in the presence of a catalyst which is a salt of a weak acid and a weak base, for example, ammonium acetate. The thus formed unsaturated cyano ester is then hydrogenated at a temperature of about 40° C. to 80° C. in the presence of a noble metal catalyst such as platinum or palladium to the N-lower alkyl-3-[(α-cyano-α-carbalkoxy)-methyl]-nortropane. Saturated cyano ester (XIII) is hydrolyzed and decarboxylated to 3(N-alkyl-nortropane)-acetic acid by heating with an excess of a volatile mineral acid such as a hydrohalic acid such as hydrobromic or hydrochloric acid. The removal of the excess mineral acid by distillation in vacuo leaves the amino acid salt (VIII, $R_1$=H) which can readily be esterified with a lower aliphatic alcohol in the presence of a strong acid, for example, a hydrohalic acid such as hydrochloric or hydrobromic acid, sulfuric acid or para toluenesulfonic acid.

UTILITY AS INTERMEDIATES

The compounds of this invention have utility as intermediates in the preparation of tertiary alcohol derivatives of 8-alkylnortropanes represented by the following formula and having utility, for example, for treating the parasympathetic nervous system in providing, for example, antispasmodic and anticholinergic action and further having utility as antiemetics and for treating the central nervous system, for example, for treating psychotics and psychoneurotics:

FORMULA 3

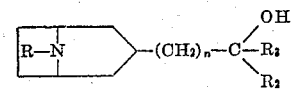

in which:

R is a straight or branched chain lower alkyl radical having preferably from 1 to 4 carbon atoms.

$R_2$ and $R_3$ are selected from the group consisting of straight or branched chain lower alkyl groups having preferably from 1 to 6 carbon atoms, cycloalkyl groups having from 5 to 6 carbon atoms, cycloalkyl-alkyl groups having 6 to 10 carbon atoms, 2-thienyl, 2-pyridyl, phenyl and phenyl substituted with alkyl groups having not in excess of 4 carbon atoms and phenyl substituted with alkoxy groups having not in excess of 4 carbon atoms.

n is from 0 to 3.

As is apparent from the above formula, the carbon atom or carbon chain carrying the tertiary hydroxyl group will be attached to the 3 position of the tropane nucleus.

Where hereinafter used in the description, $R_2$ and $R_3$ will be as defined above.

Similarly, the compounds of this invention are useful as intermediates in forming the organic and inorganic acid addition salts and quaternary ammonium salts of the compounds of Formula 3 above, all of which also have utility as intermediates for use in the preparation of compounds having utility for treating the parasympathetic nervous system in providing, for example, antispasmodic and anticholinergic action and further having utility as antiemetics and for treating the central nervous system, for example, for treating psychotics and psychoneurotics. Exemplary of acid addition salts are those formed with sulfuric, phosphoric, hydrochloric, hydrobromic, sulfamic, citric, lactic, maleic, malic, succinic, tartaric, cinnamic, benzoic, oxalic, etc. By way of example of quaternary ammonium salts, they may be formed with a variety of organic esters of sulfuric, hydrochalic and aromatic sulfonic acids. Exemplary of such esters are methyl chloride, ethyl chloride, methyl bromide, propyl bromide, ethylene bromohydrin, benzyl chloride, benzyl bromide, naphthyl methyl chloride, phenethyl bromide, dimethyl sulfate, methyl benzene sulfonate, methyl toluene sulfonate, etc.

Where $R_2$ and $R_3$ are the same, the compounds of Formula 3 above are formed by the reaction of the carboxylic ester derivatives of this invention (Formula 2) and the lithium or magnesium derivative prepared from lower alkyl bromides, cycloalkyl bromides having from 5 to 6 carbon atoms, cycloalkyl-alkyl bromides having from 6 to 10 carbon atoms, phenyl bromide, substituted phenyl bromides, 2-bromo-pyridine and 2-bromothiophene as illustrated by the following general scheme:

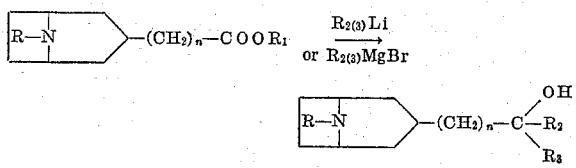

In general, it will be desirable to use the lithium derivative instead of the magnesium derivative, except in the case of cycloalkyl bromides, since the chief product using the organo magnesium reagent will usually be the corresponding ketone and the desired carbinol will be formed only in low yield. In carrying out this reaction, it is advantageous to use a solvent such as diethyl ether and to employ an excess of the organo-metallic reagent.

The compounds of this invention (Formula 2) may also be used to form the amino alcohol compounds of Formula 3 above by first forming an intermediate compound having the following formula:

FORMULA 4

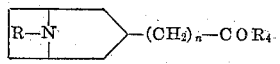

in which: $R_4$ is selected from the group consisting of straight or branched chain lower alkyl radicals having preferably 1 to 6 carbon atoms, 2-thienyl, cyclopentyl, cyclohexyl, cycloalkyl-alkyl having from 6 to 10 carbon atoms, phenyl, phenyl substituted with an alkyl group containing not in excess of 4 carbon atoms and phenyl substituted with an alkoxy group containing not more than 4 carbon atoms.

The compounds of Formula 4 are readily formed by reacting the Grignard derivative prepared from straight or branched chain lower alkyl bromides having preferably 1 to 6 carbon atoms, phenyl bromide, alkyl substituted phenyl bromide, alkoxy substituted phenyl bromide, 2-bromothiophene, cyclohexyl bromide or cyclopentyl bromide, cycloalkyl-alkyl bromides having 6 to 10 carbon atoms with one of the esters defined in Formula 2 above. It is desirable to carry out the Grignard reaction in a solvent, such as diethyl ether, using a molar excess of the Grignard reagent. The resulting amino ketones (Formula 4) will be isolated and purified by distillation or by the crystallization of the organic or inorganic acid salts from a suitable solvent. The intermediate amino ketone compounds of Formula 4 are also readily formed by the reaction of the lithium derivative prepared from lower alkyl bromides, cycloalkyl-alkyl bromides having 6 to 10 carbon atoms, phenyl bromide, alkyl and alkoxy substituted phenyl bromides, 2-bromothiophene, with one of the carboxylic acids defined in Formula 2 above. This reaction is carried out using a solvent such as diethyl ether and preferably employing an excess of the lithium reagent.

The intermediate amino ketone compounds of Formula 4 also have utility as antispasmodic and anticholinergic agents.

The intermediate amino ketone of Formula 4 can be used to produce amino alcohols of Formula 3 above where $R_2$ and $R_3$ are the same or different as illustrated by the following general scheme:

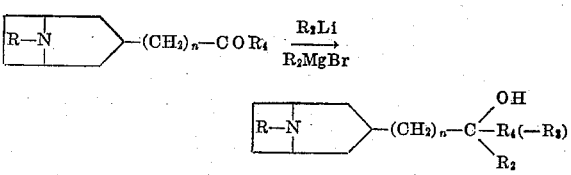

The ketone is reacted variously with the lithium or magnesium derivative prepared from lower alkyl bromides, cycloalkyl bromides having 5 to 6 carbon atoms, cycloalkyl-alkyl bromides having 6 to 10 carbon atoms, phenyl bromides, substituted phenyl bromides, 2-bromopyridine and 2-bromothiophene, depending on the end product desired and desirably in a solvent such as diethyl ether and using an excess of the lithium or magnesium reagent. In general, superior yields are achieved using the lithium derivative.

The invention will be further clarified by reference to the following specific examples:

*Example 1.—Methyl 3-tropanecarboxylate*

*Methyl 3 - (3 - acetoxytropane)carboxylate (α-ecgonine acetate).*—A solution of 10 g. of methyl 3-(3-hydroxytropane)-carboxylate (methyl α-ecgonine) (Willstatter, Ber. 29, 1575 (1896)) in 50 ml. of acetic anhydride is heated to 100° C. for 4 hours. The excess acetic anhydride and acetic acid are removed in vacuo and the residue poured into ice water. The mixture is saturated with potassium carbonate and the product extracted with ether. After evaporation of ether the crude methyl 3-(3-acetoxytropane)-carboxylate is purified by distillation; B. P. 162–165° C. (15 mm.); M. P. 66–67° C. The picrate after recrystallization from alcohol-water mixture melts at 215–217° C.

*Methyl 3-(2-tropene)carboxylate.*—Methyl 3-(3-acetoxytropane)-carboxylate (20 g.) is added dropwise over a 7 min. period to a vertical pyrex tube (25 mm. diameter), packed for a length of 8 in. with ¼ to ½ in. pieces of Pyrex tubing of 7 mm. diameter, and heated at 420° C. During the addition, the apparatus is swept out with nitrogen. The product, collected by means of an efficient condenser at the bottom of the tube, is dissolved in dilute hydrochloric acid and the mixture extracted with three portions of ether. The aqueous acid solution is saturated with potassium carbonate and the product removed by extraction with ether. Distillation of the ether solution gives methyl 3-(2-tropene)-carboxylate as a pale yellow liquid, B. P. 131–134° C. (15 mm.); $n_D^{25.5}$ 1.4998. The picrate after recrystallization from water melts at 207–208° C.

*Methyl 3-tropanecarboxylate.*—Methyl 3-(2-tropene)-carboxylate (13 g.) dissolved in 100 ml. of methanol is hydrogenated over 5 g. of Raney nickel catalyst at 50 p. s. i. pressure at room temperature until hydrogen absorption ceases. Distillation of the mixture, after removal of the catalyst by filtration, gives methyl 3-tropanecarboxylate as a colorless liquid, B. P. 128–132° C. (18 mm.); $n_D^{25}$ 1.4819. The picrate of the base, after recrystallization from water, melts at 171–172° C.

Exemplifying the utility of the thus formed compound as an intermediate, a solution of phenyl lithium in 100 ml. of ether is prepared in the usual way from 34.5 g. of bromobenzene and 3.5 g. of lithium. To the stirred solution cooled at 0° C. is slowly added 10.1 g. of methyl 3-tropanecarboxylate dissolved in 100 ml. of ether. The mixture is stirred 90 min. at room temperature and then added to 150 ml. of water. The white solid which forms is collected on a filter and washed with ether. Recrystallization of the solid from ethyl acetate gives diphenyl 3-tropanecarbinol which melts at 185.5–186° C.

*3-tropanecarboxylic acid hydrochloride.*—By refluxing a solution of 5 g. of methyl 3-tropanecarboxylate made as above in 50 cc. of concentrated hydrochloric acid for several hours and then evaporating the solution to dryness in vacuo, the hydrochloride of 3-tropanecarboxylic acid is obtained.

*Example 2.—n-Butyl 3-tropanecarboxylate*

A solution of 4 g. of 3-tropanecarboxylic acid hydrochloride made as in Example 1 in 35 cc. of n-butyl alcohol is refluxed for several hours while hydrogen chloride is passed into the mixture. The butanol is removed in vacuo and the residue added to 10 cc. of water. The mixture is made basic with potassium carbonate and the product separated by extraction with ether. Distillation of the extract given n-butyl 3-tropanecarboxylate.

*Example 3.—Ethyl 3-tropaneacetate*

*Ethyl cyano 3-tropaneacetate.*—A mixture of 13.9 g. of tropinone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 50° C. Hydrogenation is interrupted when one mole equivalent of hydrogen has been absorbed. After removal of the catalyst, the solution is evaporated in vacuo on a warm water bath. The amber oily residue is dissolved in dilute hydrochloric acid and the solution is extracted with ether. The acid solution is neutralized and saturated with potassium carbonate and the product removed by extraction with ether. Distillation of the ether solution gives ethyl cyano-3-tropaneacetate as a yellow oil, B. P. 116–118° (0.3 mm.); $n_D^{24}$ 1.4942. The picrate of the base, after recrystallization from a mixture of ethanol and acetone, melts at 179–180°.

*Ethyl 3-tropaneacetate.*—A solution of 8 g. of ethyl cyano-3-tropaneacetate in 30 ml. of 37% hydrochloric acid is refluxed for 13 hours. The solution is evaporated in vacuo and the residue dried by successive addition and removal by distillation of absolute ethanol. The crude 3-tropane-acetic acid hydrochloride is esterified by allowing its solution in 50 ml. of dry ethanol saturated with hydrogen chloride to stand 3 days at room temperature. Most of the alcohol is distilled in vacuo, cold concentrated potassium hydroxide solution is added to the residue and the product removed by extraction with ether. After distillation of the solvent, ethyl 3-tropaneacetate is obtained as a colorless oil distilling at 104–105° (2 mm.); $n_D^{25}$ 1.4774. The picrate of the amino ester melts at 141–142° after recrystallization from ethanol.

*Cyclohexyl 3-tropanemethyl ketone.*—Exemplifying the use of the thus formed compound as an intermediate, an ether solution of cyclohexyl magnesium bromide is prepared in the usual way from 11.5 g. of magnesium and 77 g. of cyclohexyl bromide. To the stirred solution cooled to 0° C. is added slowly 25 g. of ethyl 3-tropaneacetate dissolved in 45 ml. of ether. The mixture is stirred at 0° C. for 0.5 hour and then at room temperature for 2.5 hours. The mixture is again cooled to 0° C. and a solution of 483 g. of the sodium salt of ethylene diamine tetraacetic acid in 590 ml. of water is added slowly with stirring. The ether layer is removed and the aqueous mixture extracted with several portions of ether. Distillation of the ether solution under reduced pressure gives cyclohexyl 3-tropanemethyl ketone; B. P. 141–144° C. (0.8 mm.). The picrate of the base melts at 176–178° C. after recrystallization from dilute ethanol.

*1-cyclohexyl-1-phenyl-2-(3-tropane)ethanol.*—A solution of phenyl lithium in 130 ml. of ether is prepared in the usual way from 1.6 g. of lithium and 18 g. of bromobenzene. With stirring 10 g. of cyclohexyl 3-tropanemethyl ketone dissolved in 40 ml. of ether is slowly added to the solution cooled to 0° C. The mixture is stirred one hour at 0° C. and 3 hours at room temperature. Ice water is then slowly added and the resulting mixture stirred vigorously for 30 minutes. The ether layer is separated and the aqueous layer extracted with ether. On evaporation of the ether solution (dried over sodium sulfate) a clear oil is obtained which crystallizes when stirred with a small volume of petroleum ether. Recrystallization of the white solid from ethyl acetate gives transparent crystals of 1-cyclohexyl-1-phenyl-2-(3-tropane)-ethanol melting at 139–140.5° C.

*3-tropaneacetic acid hydrochloride.*—5 gm. of ethyl 3-tropaneacetate made as disclosed above is dissolved in 50 cc. of 37% hydrochloric acid and the solution refluxed for several hours. Evaporation of the solution to dryness in vacuo gives 3-tropaneacetic acid hydrochloride which melts at 172–174° C. after recrystallization from a mixture of methanol and ether.

*Example 4.—Methyl 3-(N-isopropylnortropane)acetate*

A mixture of 16.7 g. of N-isopropylnortropinone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 60° C. Hydrogenation is interrupted when one mole equivalent of hydrogen has been absorbed. After removal of the catalyst, the solution is evaporated in vacuo on a warm water bath. The oily residue is dissolved in concentrated hydrochloric acid and the solution is extracted with several portions of ether. The aqueous acid solution is refluxed 12 hours, evaporated in vacuo, and the residue is dried by successive addition and removal by distillation of dry benzene. The crude 3-(N-isopropylnortropane)acetic acid hydrochloride so obtained is esterified by allowing its solution in 100 ml. of anhydrous methanol saturated with hydrogen chloride to stand 3 days at room temperature. Most of the methanol is distilled under reduced pressure, cold concentrated potassium hydroxide solution is added to the residue, and the product is removed by extraction with ether. Distillation of the ether solution in vacuo gives methyl 3-(N-isopropylnortropane)-acetate as a colorless oil distilling at 124–127° C. (0.3 mm.).

Exemplifying the utility of methyl 3-(N-isopropylnortropane)-acetate as an intermediate, a solution of p-anisyl magnesium bromide in 200 ml. of ether is prepared from 28 g. of p-bromoanisole and 3.7 g. of magnesium in the usual way. The solution is cooled to 0° C. and 11.3 g. of methyl 3-(N-isopropylnortropane)-acetate dissolved in 25 ml. of ether is added slowly with stirring. After the addition the mixture is stirred for one hour at room temperature and is then heated at reflux temperature for 2 hours. The mixture is cooled to 0° C. and a solution of 135 g. of the sodium salt of ethylenediamine tetraacetic acid in 180 ml. of water is added slowly with stirring. The ether layer is removed and the aqueous layer is extracted with two portions of chloroform. Evaporation of the solvents from the combined extracts gives the crude product as a thick oil which is purified by distillation under reduced pressure. p-Anisyl 3-(N-isopropylnortropane)-methyl ketone obtained in this way boils at 160–164° C. (0.2 mm.) and crystallizes as a white solid upon standing.

*1 - (p - anisyl) - 1 - phenyl - 2 - [3-(N - ispropylnortropane)]-ethanol.*—To a solution of phenyl lithium in 45 ml. ether, prepared in the usual way from 7.9 g. of bromobenzene and 0.7 g. of lithium, is slowly added with stirring at 0° C. a solution of 7.5 g. of p-anisyl 3-(N-isopropylnortropane)-methyl ketone in 20 ml. of ether. Following the addition the mixture is stirred at 0° C. for one hour, and then at room temperature for four hours. Water (50 ml.) is then added and the mixture is stirred vigorously for 2 hours. The ether layer is removed and the aqueous mixture is extracted with two portions of chloroform. Evaporation of the solvents from the combined extracts gives a crystalline residue of crude product which is purified by recrystallization from ethyl acetate. In this way, 1-(p-anisyl)-1-phenyl-2-[3-(N-isopropylnortropane)]-ethanol is obtained as a white crystalline solid.

*Example 5.—Ethyl β-(3-tropane)-propionate*

2-(3-tropane)ethanol.—To a stirred solution of 30 g. of lithium aluminum hydride in 2 liters of dry ether is added a solution of 164 g. of ethyl 3-tropaneacetate (made as in Example 3) in 500 ml. of ether at such a rate that steady reflux of ether is maintained. After the mixture is stirred at reflux temperature for 3 hours, it is cooled to 0° C. and 72 ml. of water added gradually. The resulting mixture is stirred for 1.5 hours, filtered and the solid collected is washed with ether. Evaporation of ether from the filtrate gives solid 2-(3-tropane)-ethanol which, after recrystallization from a mixture of benzene and petroleum ether, melts at 63–64° C. The picrate of the amino alcohol recrystallizes from a mixture of acetone and ether and melts at 125–126° C.

1-chloro-2(3-tropane)ethane hydrochloride.—To a solution of 10 g. of 2-(3-tropane)ethanol in 50 ml. of chloroform is slowly added 14.3 g. of thionyl chloride. The reaction mixture is heated at gentle reflux for 45 minutes and then evaporated to dryness in vacuo. Recrystallization of the light tan solid residue from a mixture of alcohol and ether gives pure 1-chloro-2(3-tropane)ethane hydrochloride, M. P. 167–168° C.

To obtain the free chloro amine the hydrochloride salt is treated with potassium carbonate solution and the oily base extracted with ether. Distillation of the ether solution gives 1-chloro-2(3-tropane)ethane, B. P. 81° C. (0.8 mm.). The picrate of the base, after recrystallization from water, melts at 158.5–159.5°.

β - (3 - tropane)propionitrile.—1 - chloro - 2(3 - tropane)ethane (47 g.) and 0.1 g. of sodium iodide are added to a solution of 49 g. of potassium cyanide in a mixture of 175 ml. of alcohol and 75 ml. of water. The resulting solution is heated at reflux temperature for 17 hours and then evaporated in vacuo. Sodium hydroxide solution is added to the residual mixture of oil and solid and the oil is separated by extraction with ether. Distillation of the ether solution gives β-(3-tropane)propionitrile, B. P. 114–116° C. (0.3 mm.); $n_D^{25}$ 1.4958. The picrate of the base, after recrystallization from a mixture of acetone and ether, melts at 150–151° C.

Ethyl β-(3-tropane)propionate.—A solution of 25 g. of β-(3-tropane)-propionitrile in 100 ml. of 37% hydrochloric acid is heated at reflux temperature for several hours and then evaporated to dryness in vacuo. The solid residue is dissolved in 300 ml. of absolute ethanol, 5 ml. of concentrated sulfuric acid is added and the mixture is concentrated in vacuo and the residue treated with 40% sodium hydroxide solution. resulting solution heated at reflux temperature for 6 hours. The oil which separates is removed by extraction with ether and purified by distillation in vacuo. In this way ethyl β-(3-tropane)propionate distilling at 97–100° C. (0.4 mm.) is obtained; $n_D^{25}$ 1.4770.

The picrate of the amino ester, after recrystallization from isopropanol, melts at 107–108° C.

β-(3-tropane)propionic acid hydrochloride.—5 gm. of ethyl β-(3-tropane)propionate is dissolved in 50 cc. of 37% hydrochloric acid and the solution is refluxed for several hours. Evaporation of the solution to dryness in vacuo gives β-(3-tropane)propionic acid hydrochloride which melts at 194–195° C. after recrystallization from a mixture of methanol and ether.

*Example 6.—Ethyl β-(3-tropane)propionate*

To a suspension of 3.7 g. of 3-tropaneacetic acid hydrochloride (made as in Example 3) in 30 ml. of chloroform is added 4.7 g. of thionyl chloride and the resulting mixture heated at reflux temperature for 2.5 hours. The solvent and excess thionyl chloride are evaporated in vacuo and the last traces of the latter removed from the solid residue by successive addition and removal by distillation in vacuo of two 50 ml. portions of benzene. In this way, the acid chloride hydrochloride is obtained as a brown powder.

The acid chloride hydrochloride is suspended in 30 ml. of methylene chloride and the mixture added in portions to a solution of diazomethane, prepared in the usual way from 14.7 g. of N-methyl-N-nitroso-N'-nitroguanidine, in 200 ml. of methylene chloride kept at 0° C. After storage of the mixture at room temperature for two hours, the solvent is evaporated in vacuo to give diazomethyl 3-tropanemethyl ketone as a hygroscopic brown powder.

The diazo ketone is dissolved in 35 ml. of absolute ethanol and the solution maintained at 50–60° C. while a suspension of silver oxide, freshly prepared from 10 ml. of 10% silver nitrate solution, in 30 ml. of dry ethanol is added over a 45 minute period. After the addition the mixture is refluxed for 30 minutes and then filtered. By distillation of the filtrate in vacuo, ethyl β-(3-tropane)propionate is obtained.

1,1 - diphenyl-3-(3-tropane)propanol. — Exemplifying utility, a solution of phenyl lithium in 500 ml. of ether is prepared in the usual way from 75 g. of bromobenzene and 6.7 g. of lithium. To the stirred solution is slowly added 18 g. of ethyl β-(3-tropane)propionate dissolved in 50 ml. of ether. The mixture is stirred and heated at reflux temperature for 3.5 hours. After cooling 50 ml. of water is added and the mixture stirred vigorously for one hour. The ether layer is removed and the aqueous layer which contains a white solid is shaken vigorously with chloroform. The chloroform layer is separated, combined with the ether solution and the solvents are evaporated in vacuo. In this way, 1,1-diphenyl-3-(3-tropane)-propanol, a useful antispasmodic and anticholinergic agent, was obtained as a white crystalline solid melting at 141–142.5° C.

*Example 7.—Ethyl γ-(3-tropane)butyrate*

3-(3-tropane)propanol.—To a stirred solution of 3 g. of lithium aluminum hydride in 200 ml. of ether is added a solution of 17.8 g. of ethyl β-(3-tropane)propionate (made as in Example 5) in 50 ml. of ether at such a rate that steady reflux of ether is maintained. After the mixture is stirred at reflux temperature for three hours, it is cooled to 0° C. and 7.2 ml. of water is added gradually. The resulting mixture is stirred for two hours, filtered and the collected solid is washed with ether. Distillation of the ether solution in vacuo gives 3-(3-tropane)-propanol boiling at 128–131° C. (2 mm.).

1-chloro-3(3-tropane)propane.—To a solution of 7.7 g. of 3-(3-tropane)propanol in 30 ml. of chloroform is slowly added 10 g. of thionyl chloride. The reaction mixture is heated at gentle reflux for 45 minutes and then evaporated to dryness in vacuo. The residue of crude 1-chloro-3(3-tropane)propane hydrochloride is treated with potassium carbonate solution and the oily base which forms is extracted with ether. Distillation of the ether solution gives 1-chloro-3(3-tropane)propane boiling at 100–102° C. (1 mm.).

γ(3-tropane)butyronitrile. — 1 - chloro-3-(3-tropane) propane (5 g.) and 0.1 g. of sodium iodide is added to a solution of 5 g. of potassium cyanide in a mixture of 18 ml. of alcohol and 8 ml. of water. The resulting solution is heated at reflux temperature for 18 hours and then evaporated in vacuo. Sodium hydroxide solution is added to the residual mixture of oil and solid and the oil is separated by extraction with ether. Distillation of the ether solution under reduced pressure gives γ-(3-tropane)butyronitrile boiling at 132–135° (0.3 mm.).

*Ethyl γ-(3-tropane)butyrate.*—A solution of 3 g. of γ-(3-tropane)-butyronitrile in 15 ml. of 37% hydrochloric acid is heated at reflux temperature for three hours and then evaporated to dryness in vacuo. The solid residue is dissolved in 35 ml. of absolute ethanol, 0.5 ml. of concentrated sulfuric acid is added, and the resulting solution is heated at reflux temperature for 7 hours. The mixture is concentrated in vacuo and the residue is treated with 40% sodium hydroxide solution. The oil which separates is removed by extraction with ether and purified by distillation under reduced pressure. In this way, ethyl γ-(3-tropane)-butyrate distilling at 115–119° C. (0.5 mm.) is obtained.

*p-Tolyl γ-(3-tropane)-propyl ketone.*—Exemplifying utility as an intermediate, a solution of p-tolyl magnesium bromide in 40 ml. of ether is prepared in the usual way from 5.1 of p-bromotoluene and 0.75 g. of magnesium. To the stirred solution, cooled to 0° C., is slowly added a solution of 2.3 g. of ethyl γ-(3-tropane)butyrate in 10 ml. of ether. After the addition the mixture is stirred at room temperature for one hour and then at reflux temperature for 2 hours. The mixture is cooled to 0° C. and a solution of 27 g. of the sodium salt of ethylenediaminetetraacetic acid in 36 ml. of water is added slowly with stirring. The ether layer is removed and the aqueous layer is extracted with several portions of ether. Distillation of the ether extracts under reduced pressure gives p-tolyl γ-(3-tropane)propyl ketone boiling at 188–192° C. (0.2 mm.).

*1-(2-pyridyl)-1-p-tolyl-4-(3-tropane)butanol.*—A solution of n-butyl lithium in 15 ml. of ether is prepared in the usual way from 1.9. g. of n-butyl chloride and 0.35 g. of lithium. With stirring the solution is cooled to −45° C. and 2.8 g. of 2-bromopyridine dissolved in 5 ml. of ether is added slowly. After the addition the mixture is stirred 10 minutes and 1.5 g. of p-tolyl γ-(3-tropane)-propylketone dissolved in 15 ml. of ether is added slowly. The mixture is then stirred 15 minutes at −15° C. Water (25 ml.) is added slowly and the mixture is stirred vigorously for 30 minutes. The ether layer is removed and the aqueous layer is stirred vigorously with an equal volume of chloroform until two clear layers result. Evaporation in vacuo of the solvents from the combined ether and chloroform solutions gives a yellow oil which crystallizes when stirred with a mixture of ether and petroleum ether. By recrystallization of the product from a mixture of ethyl acetate and petroleum ether 1-(2-pyridyl)-1-p-tolyl-4-(3-tropane)-butanol is obtained as a white crystalline solid.

*Example 8.—3-(N-isopropylnortropane)acetic acid*

A mixture of one gram of methyl 3-(N-isopropylnortropane)acetate, made as in Example 4, and 50 ml. of water is heated at reflux temperature for 15 hours. By evaporating the resulting solution to dryness and washing the residue with ether, 3-(N-isopropylnortropane)acetic acid is obtained as a white crystalline solid.

*Example 9.—γ-(3-tropane)butyric acid*

A mixture of one gram of ethyl γ-(3-tropane)butyrate, made as in Example 7, and 50 ml. of water is heated at reflux temperature for 24 hours. By evaporating the resulting solution to dryness in vacuo and washing the residue with ether, γ-(3-tropane)butyric acid is obtained as a white solid.

*Example 10.—Methyl 3-tropanecarboxylate methobromide*

By adding 0.1 g. of methyl 3-tropanecarboxylate, made as in Example 1, to an excess of methyl bromide in acetone the methobromide salt is obtained. After recrystallization from ethanol-ether mixture the salt melts at 275–278° C.

*Example 11.—Methyl 3-tropanecarboxylate methiodide*

By adding 0.1 g. of methyl 3-tropanecarboxylate, made as in Example 1, to an excess of methyl iodide in acetone solution the methiodide salt is obtained. After recrystallization from ethanol the salt melts at 218–219° C.

*Example 12.—Maleate salt of ethyl β-(3-tropane)-propionate*

To 2.3 g. of ethyl β-(3-tropane)propionate, made as in Example 5, dissolved in ethanol is added 1.2 g. of maleic acid. By evaporation of the resulting solution to dryness in vacuo the maleate salt of ethyl β-(3-tropane)propionate is obtained.

*Example 13.—Citrate salt of ethyl 3-tropaneacetate*

To an ethanolic solution of 2.1 g. of ethyl 3-tropaneacetate, made as in Example 3, is added 1.9 g. of citric acid. By evaporation of the solution to dryness in vacuo the citrate salt of ethyl 3-tropaneacetate is obtained.

The preparation of the compounds of this invention which are useful in themselves, or for the preparation of other compounds, which are useful for treating the parasympathetic nervous system in providing, for example, antispasmodic and anticholinergic action and which further have utility as antiemetics and for treating the central nervous system, for example, for treating psychotics and psychoneurotics will be obvious from the above description.

It is not desired to be limited except as set forth in the following claims.

The compounds of Formulas 3 and 4 are the subject matter of my copending applications Serial No. 519,649, filed July 1, 1955, and Serial No. 519,648, filed July 1, 1955, respectively, and reference may be made thereto for further examples of these compounds as well as for methods of their preparation.

What is claimed is:

1. Compounds of the class consisting of a free base and the acid addition and quaternary ammonium salts thereof, the free base having the following formula:

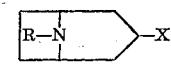

in which R is a lower alkyl radical and X is selected from the group consisting of —COOR$_1$, —CH$_2$COOR$_1$ and —CH$_2$CH$_2$COOR$_1$, R$_1$ being selected from the group consisting of hydrogen and a lower alkyl radical.

2. The method of preparing 8-alkylnortropanes having the following formula:

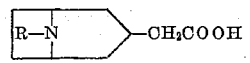

in which R is a lower alkyl group which comprises reacting a lower alkyl ester of cyanoacetic acid with an N-lower alkyl-nortropinone in a lower fatty acid solvent, hydrogenating the thus formed unsaturated cyano ester to the N-lower alkyl-3-[(α-cyano-α-carbalkoxy)-methyl]-nortropane, hydrolyzing and decarboxylating the saturated cyano ester by heating with an excess of a mineral acid and removing the excess mineral acid.

3. The method of preparing ester derivatives of 8-alkylnortropanes having the following formula:

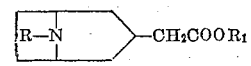

in which R and R$_1$ are lower alkyl groups which comprise reacting a lower alkyl ester of cyanoacetic acid with an N-lower alkyl-nortropinone in a lower fatty acid solvent, hydrogenating the thus formed unsaturated cyano ester to the N-lower alkyl-3-[(α-cyano-α-carbalkoxy)-methyl]-nortropane, hydrolyzing and decarboxylating the saturated cyano ester to 3(N-alkyl-nortropane) acetic acid by heating with an excess of a mineral acid and removing the excess mineral acid and esterifying the 3-(N-alkyl nortropane) acetic acid with a lower aliphatic alcohol to form the desired ester derivative of 8-alkylnortropanes.

4. Ethyl 3-tropaneacetate.
5. Methyl 3-tropanecarboxylate.
6. 3-tropanecarboxylic acid hydrochloride.
7. 3-tropaneacetic acid hydrochloride.
8. n-Butyl 3-tropanecarboxylate.

No references cited.